US011897143B2

(12) United States Patent
Wang et al.

(10) Patent No.: US 11,897,143 B2
(45) Date of Patent: Feb. 13, 2024

(54) METHOD FOR PERFORMING NON-REVISITING COVERAGE TASK BY MANIPULATOR WITH LEAST NUMBER OF LIFT-OFFS

(71) Applicant: ZHEJIANG UNIVERSITY, Hangzhou (CN)

(72) Inventors: Yue Wang, Hangzhou (CN); Tong Yang, Hangzhou (CN); Rong Xiong, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 229 days.

(21) Appl. No.: 17/489,798

(22) Filed: Sep. 30, 2021

(65) Prior Publication Data

US 2022/0016777 A1 Jan. 20, 2022

Related U.S. Application Data

(63) Continuation of application No. PCT/CN2020/097079, filed on Jun. 19, 2020.

(51) Int. Cl.
*B25J 9/16* (2006.01)

(52) U.S. Cl.
CPC ... *B25J 9/1664* (2013.01); *G05B 2219/36248* (2013.01); *G05B 2219/40369* (2013.01)

(58) Field of Classification Search
CPC ......... B25J 9/1664; G05B 2219/36248; G05B 2219/40369

See application file for complete search history.

(56) References Cited

U.S. PATENT DOCUMENTS 8,747,188 B2 * 6/2014 Maloney ................. B24B 49/04
451/8
2012/0215352 A1 8/2012 Eberst

FOREIGN PATENT DOCUMENTS

| CN | 107414860 A | 12/2017 |
| CN | 107717991 A | 2/2018 |
| CN | 108297105 A | 7/2018 |

(Continued)

OTHER PUBLICATIONS

Funes-Lora, M. A., et al., "A Novel Mesh Following Technique Based on a Non-Approximant Surface Reconstruction for Industrial Robotic Path Generation," Feb. 1, 2019, IEEE, vol. 7, pp. 22807-22817 (Year: 2019).*

(Continued)

*Primary Examiner* — Abby Y Lin
*Assistant Examiner* — Karston G. Evans
(74) *Attorney, Agent, or Firm* — W&G Law Group

(57) ABSTRACT

The present disclosure provides a method for performing a non-revisiting coverage task by a manipulator with a least number of lift-offs, and relates to the technical field of manipulator path planning. By explicitly considering lift-offs of an end-effector from a surface of an object due to kinematic constraints when the manipulator performs a task of covering the surface of the object, this method transforms a problem of coverage path design into a problem of sub-cell decomposition and solves the problem to obtain an approach for the manipulator to cover a sub-cell. The method of the present disclosure minimizes the number of lift-offs of the end-effector from the surface of the object when the manipulator performs the coverage task.

2 Claims, 9 Drawing Sheets

(56) References Cited

FOREIGN PATENT DOCUMENTS

CN    108789426 A    11/2018
CN    109910015 A    6/2019

OTHER PUBLICATIONS

Yang, T., et al., "Cellular Decomposition for Nonrepetitive Coverage Task With Minimum Discontinuities," Aug. 2020, IEEE/ASME Transactions on Mechatronics, vol. 25, No. 4, pp. 1698-1708 (Year: 2020).*
Yang, T., et al., "Optimal Object Placement for Minimum Discontinuity Non-revisiting Coverage Task," Jun. 2021, 2021 IEEE International Conference on Robotics and Automation (ICRA 2021), pp. 8422-8428 (Year: 2021).*
Yang, T., et al., "Template-Free Nonrevisiting Uniform Coverage Path Planning on Curved Surfaces," Jun. 7, 2023, IEEE/ASME Transactions on Mechatronics, pp. 1-9 (Year: 2023).*
International Search Report (PCT/CN2020/097079); dated Jun. 19, 2020.

* cited by examiner

METHOD FOR PERFORMING NON-REVISITING COVERAGE TASK BY MANIPULATOR WITH LEAST NUMBER OF LIFT-OFFS

TECHNICAL FIELD

The present disclosure relates to the technical field of manipulator path planning, in particular to a method for performing a non-revisiting coverage task by a manipulator with a least number of lift-offs.

BACKGROUND

As a common task in industrial applications, surface coverage is widely applied in close-range modeling, painting and polishing. In order to meet the needs of processing a general-shaped object in the three-dimensional (3D) space, the coverage task is usually performed by a manipulator.

The kinematics of the manipulator is a hot issue that has been studied for decades. The key to the kinematics of the manipulator is to map from the joint space composed of various joint angles of the manipulator to the pose space of an end-effector of the manipulator. The mapping relationship is nonlinear when there are rotary joints in the manipulator. In addition, surface coverage is a coverage path planning problem in the manipulator path planning. For a given space to be covered, a path is designed for the manipulator to run along to pass through every point in the space to be covered. In this process, the manipulator is regarded as a particle.

When performing the surface coverage task, the end-effector of the manipulator runs along a set coverage path so as to pass through every point on the surface of the object. However, due to the kinematic constraint of the manipulator, the end-effector cannot completely track the entire coverage path. In this case, the coverage task has to be suspended, and the manipulator needs to adjust its poses to complete the follow-up tracking. The traditional coverage path planning algorithm is to generate a path on the covered area, which is equivalent to directly generating a coverage path on the surface of an object in the issue of coverage path planning of a manipulator. However, since the forward kinematics of the manipulator is nonlinear, the coverage path in the workspace is easily cut off due to the kinematic constraint of the manipulator. The manipulator needs to lift the end-effector off to transform its pose before the end-effector re-contacts with the surface of the object. The "lift-off and re-contact" process of the end-effector requires a complex control strategy, which causes waste of additional time and energy and decreases industrial production efficiency.

SUMMARY

In order to overcome the shortcomings of the prior art, an objective of the present disclosure is to provide a method for performing a non-revisiting coverage task by a manipulator with a least number of lift-offs. The present disclosure achieves a task of covering a surface of an object in a completely known environment, during which an end-effector (EE) of the manipulator only needs to be lifted off the surface of the object for a least number of times.

The objective of the present disclosure is achieved by the following technical solutions.

A method for performing a non-revisiting coverage task by a manipulator with a least number of lift-offs, where an end-effector of the manipulator is in point contact with a surface of an object to be covered; a relative positional relationship among the object to be covered, the manipulator and a surrounding obstacle is known and remains unchanged during the performing of the coverage task.

The method for performing a non-revisiting coverage task by a manipulator with a least number of lift-offs specifically includes the following steps:

Step 1: solving inverse kinematics of the manipulator for all points on a curved-surface M of the object to be covered to obtain poses of the manipulator for covering the points; denoting all feasible poses for any point p on the curved-surface M as $\{J_{p1}, J_{p2}, \ldots, J_{pn}\}$; determining that all the points correspond to a set of feasible poses if the surface of the object to be covered is fully covered; otherwise, determining that a non-coverable point on the surface of the object to be covered does not correspond to any pose, where the feasible poses for all the points on the surface M constitute a joint space of the manipulator, and the joint space of the manipulator includes singular and non-singular poses;

Step 2: removing all singular poses, and dividing the joint space of the manipulator into a plurality of disjoint sets, where each set stores poses that can be continuously executed by the manipulator; labeling the poses in a same set with a same number, and labeling poses in different sets with different numbers; numbering the different sets as $c_1, \ldots, c_n$; obtaining a combination of numbers corresponding to each point p on the curved-surface M based on the numbers corresponding to the feasible poses for the point;

Step 3: dividing points with a same combination of numbers and connected on the curved-surface M of the object to be covered into a same cell according to the connectivity of the points on the surface M of the object to be covered; defining a boundary between two cells as a topological edge; giving each cell a unique number to obtain a first cell, a second cell, . . . , an N-th cell, where each cell covers different types of poses of the manipulator within this cell (represented by the combination of numbers), and stores numbers of adjacent cells in sequence;

Step 4: encoding all different cutting methods of a simply-connected cell by using binary numbers, where a number of digits in the binary number represents a number of topological edges of the cell; the corresponding digits in the binary number are 1 or 0; 0 means that the topological edge is to be retained, that is, the two cells on both sides of the topological edge eventually have different numbers, and the end-effector is lifted off once when the manipulator performs the task; 1 means that the topological edge is to be discarded, that is, areas on both sides of the topological edge eventually have the same number, and are to be continuously covered by the end-effector without a lift-off when the manipulator performs the task; for a cell with 1, 2 or 3 topological edges, directly deriving an optimal solution through enumeration; for a cell with more than 3 topological edges, decomposing the cell into sub-cells with less topological edges than the original cell, and solving all the sub-cells recursively to obtain all possible solutions;

Step 5: recursively solving an n-connected cell with n-1 inner boundaries, where, the n-connected cell is decomposed as follows:

(5.1) when n=1, the cell is a simply-connected cell as described in Step 4, and the cell is solved by Step 4;

(5.2) when n=2, the cell has two boundaries, an inner boundary and an outer boundary; each boundary is composed of a plurality of topological edges, and each topological edge is connected to the other cell; all possible solutions of the two-connected cell are completely classified as follows:

(5.2.1) for cutting paths that do not connect the inner and outer boundaries, separating the inner and outer boundaries to obtain two simply-connected cells, and solving the two cells separately;

(5.2.2) for cutting paths that connect the inner and outer boundaries, first designing two cutting paths that connect the inner and outer boundaries, that is, transforming a decomposition problem of the two-connected cell into a decomposition problem of two simply-connected cells, and then solving the simply-connected cells by the method in Step 4;

(5.3) when n>2, numbering the n-1 inner boundaries of the n -connected cell, where topological edges on the outer boundary and ani-th inner boundary are expressed as follows:

$$\omega = (a_1, \ldots, a_K)$$

$$\omega^i = (a_1^i, \ldots, a_{J_i}^i), i=1, \ldots, n$$

where, $a_K$ represents a topological edge between the cell and a K-th external adjacent cell, and $a_{J_i}^i$ represents a topological edge between the cell and a cell numbered $J_i$ on the i-th inner boundary;

(5.3.1) considering only the outer boundary $\omega$ and a first inner boundary $\omega^1$, and designing two cutting paths in a two-connected cell delineated by $\omega$ and $\omega^1$ to obtain two simply-connected cells according to the solution process of the two-connected cell in Step 5;

(5.3.2) placing a second inner boundary $\omega^2$ into one of the two simply-connected sub-cells generated in Step (5.3.1), such that the simply-connected sub-cell with $\omega^2$ is turned into a two-connected sub-cell; solving the two-connected sub-cell by Step (5.2), and finally dividing the sub-cell into two simply-connected sub-cells, where after this step, the original n-connected cell includes $\omega$, $\omega^1$, $\omega^2$ and is divided into three simply-connected sub-cells;

(5.3.3) subjecting each of subsequent inner boundaries $\omega^3, \ldots, \omega^{n-1}$ to the following processing in sequence: placing $\omega^3, \ldots, \omega^{n-1}$ into one of the generated simply-connected sub-cells to obtain a two-connected cell, and then further dividing the cell into two simply-connected sub-cells; placing the i-th inner boundary to divide the original cell into i parts; placing the n-1 inner boundaries into the cell to divide the original cell into n simply-connected sub-cells; solving the n simply-connected sub-cells by Step 4; and Step 6: iteratively solving a topological graph generated by a kinematic model of the manipulator on the surface of the object to be covered according to the solution process in steps 4 and 5:

(6.1) for the first cell on the surface of the object to be covered, traversing and numbering all possible cutting methods for the first cell to complete all solutions of the first cell, and processing each of all the solutions by Step (6.2);

(6.2) for the second cell on the surface of the object to be covered, traversing and numbering all possible cutting methods for the second cell to complete all solutions of the second cell; discarding a solution of the second cell that contradicts with a setting of the first cell, and processing each of the remaining feasible solutions of the second cell by Step (6.3);

(6.3) sequentially processing the third to N-th cells on the surface of the object to be covered by Step (6.2), such that each cell is provided with a cutting method, and each sub-cell divided has a unique number, thereby obtaining an approach for the manipulator to cover the sub-cell.

Further, the points on the surface of the object to be covered are only covered once.

Compared with the prior art, the present disclosure has the following beneficial effects. The present disclosure provides a method for performing a non-revisiting coverage task by a manipulator with a least number of lift-offs, which minimizes the number of the lift-offs of an end-effector of the manipulator from the surface of the object when the manipulator performs a coverage task. The force/torque-position transition control strategy of the manipulator is generally considered to be complicated, and when the end-effector is not in contact with the surface of the object, the motion of the manipulator will not cause any area of the object to be covered. Therefore, the extra, non-minimum number of lift-offs of the end-effector during the coverage task of the manipulator will cause a lot of loss of time and energy. The present disclosure aims to improve the efficiency of the manipulator in performing the coverage task in industrial applications, and the method is directly applied in scenarios such as close-range modeling, painting and polishing of the surface of an object.

First, the manipulator selected in the method of the present disclosure is only limited to be non-redundant. The work of the non-redundant manipulator means that the efficiency of the non-redundant manipulator can be maximized. Since there lacks the coverage path design method provided by the present disclosure to minimize the number of lift-offs in the existing industrial applications, the end-effector of a non-redundant manipulator needs to be lifted off frequently, which greatly deceases the work efficiency. Presently, the solution to the problem is only to use a redundant manipulator. For example, for a task that can be performed with a five-degree-of-freedom manipulator, due to the too frequent lift-offs and too low efficiency of the manipulator, a six-degree-of-freedom or seven-degree-of-freedom manipulator, or several manipulators, for example, two five-degree-of-freedom manipulators, are used instead. Therefore, the present disclosure is practical for industrial application.

Second, the present disclosure only requires the relative positional relationship among the manipulator, the object to be covered and the surrounding obstacle to be unchanged during the performing of the coverage task, without any constraint on their actual spatial positions, which may be unfixed. For example, when an object to be covered on an industrial assembly line stops in front of a fixed manipulator, the manipulator covers a surface of the object, and then the object continues to move. For another example, a mobile manipulator platform (with a manipulator mounted on a movable chassis platform) moves to a place around an object to be covered, senses the surrounding environment through a sensor, and performs a coverage task during which the chassis does not move. In summary, the present disclosure has a wide range of actual industrial applications.

This method uses an enumeration method to traverse all possible combinations of numbers ($\{c_1, \ldots, c_n\}$), and thus can obtain all optimal solutions for a manipulator to perform the coverage task with the least number of lift-offs based on the given manipulator configuration, object model, obstacle model and relative positional relationship thereamong. It is provable that any manipulator coverage solution with the least number of lift-offs is a homeomorphic transformation of a certain optimal solution given by this method. The homeomorphic transformation refers to continuously changing the boundary between different areas into other shapes or continuously moving it to other positions without changing the connectivity of each area.

Therefore, the method of the present disclosure can minimize the number of lift-offs of the end-effector of the manipulator. In addition, since the motion of the manipulator does not cover any area of the surface of the object when the end-effector is lifted off the surface of the object, the method of the present disclosure indirectly minimizes the energy loss of the manipulator in the coverage task.

DETAILED DESCRIPTION

The present disclosure provides a method for performing a non-revisiting coverage task by a manipulator with a least number of lift-offs. An end-effector (EE) of the manipulator can continuously cover each area without being lifted off a surface of an object. The method decomposes the surface of the object into the smallest areas, thereby ensuring the least number of lift-offs of the end-effector in the task of covering the surface of the object.

The present disclosure uses a non-redundant manipulator to perform the coverage task. The end-effector of the manipulator is in point contact with the surface of the object to be covered. A relative positional relationship among the object to be covered, the manipulator and a surrounding obstacle is known and remains unchanged during the performing of the coverage task. The point contact is flexible, as long as no contact area between the end-effector and the surface of the object to be covered needs to be considered during the planning of a specific coverage path. Points on the surface of the object to be covered are only covered once.

The method for performing a non-revisiting coverage task by a manipulator with a least number of lift-offs specifically includes the following steps:

Step 1: Inverse kinematics of the manipulator is solved to obtain poses of the manipulator for covering all points on the curved-surface M of the object to be covered. All feasible poses for any point p on the curved-surface M are denoted as $\{J_{p1}, J_{p2}, \ldots, J_{pn}\}$. It is determined that all the points correspond to a set of feasible poses if the surface of the object to be covered is fully covered. Otherwise, it is determined that a non-coverable point on the surface of the object to be covered does not correspond to any pose. The feasible poses for all the points on the curved-surface M constitute a joint space of the manipulator, and the joint space of the manipulator includes singular and non-singular poses.

Step 2: When the manipulator is in a singular pose, a Jacobian matrix of the manipulator is not of full rank, such that the end-effector of the manipulator cannot resist a force or torque from a certain direction. Therefore, in the task that requires the end-effector to contact with the object to be covered, the singular pose cannot be used. After all singular poses are removed, the joint space of the manipulator is divided into a plurality of disjoint sets, where each set stores poses that can be continuously executed by the manipulator. Poses in the same set are labeled with the same number, and poses in different sets are labeled with different numbers. The different sets are numbered as $c_1, \ldots, c_n$, and a combination of numbers corresponding to each point p on the curved-surface M is obtained based on the numbers corresponding to the feasible poses for the point.

Figure 1:
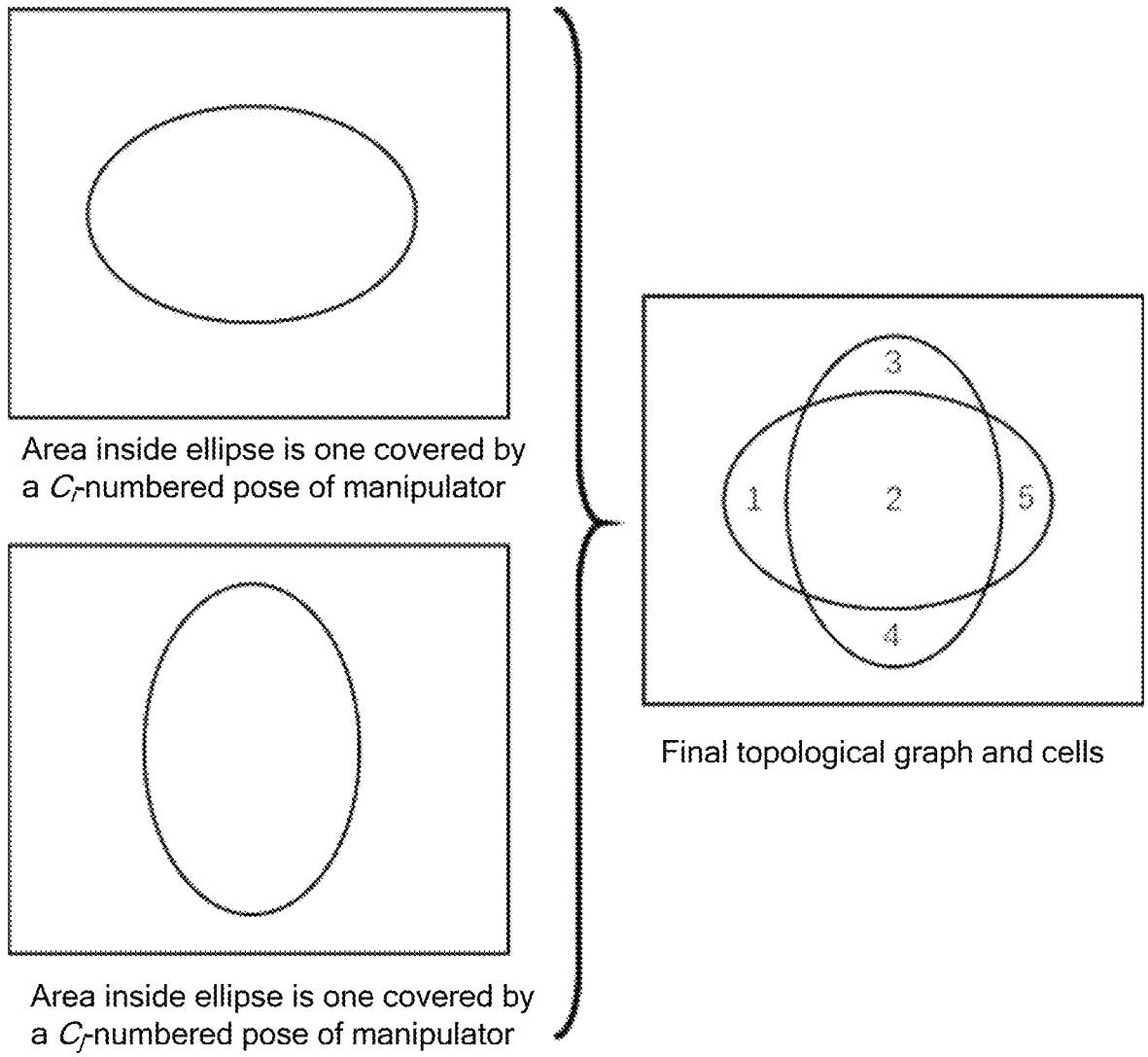
FIG. 1 shows a schematic diagram of constructing a topological graph.

Step 3: As shown in FIG. 1, points with the same combination of numbers and connected on the curved-surface M of the object to be covered are divided into the same cell according to the connectivity of the points on the surface M of the object to be covered. A boundary between two cells is defined as a topological edge. Each cell is given a unique number to obtain a first cell, a second cell, ..., an N-th cell. Each cell covers different types of poses of the manipulator within this cell, and stores the numbers of adjacent cells in sequence.

Figure 2:
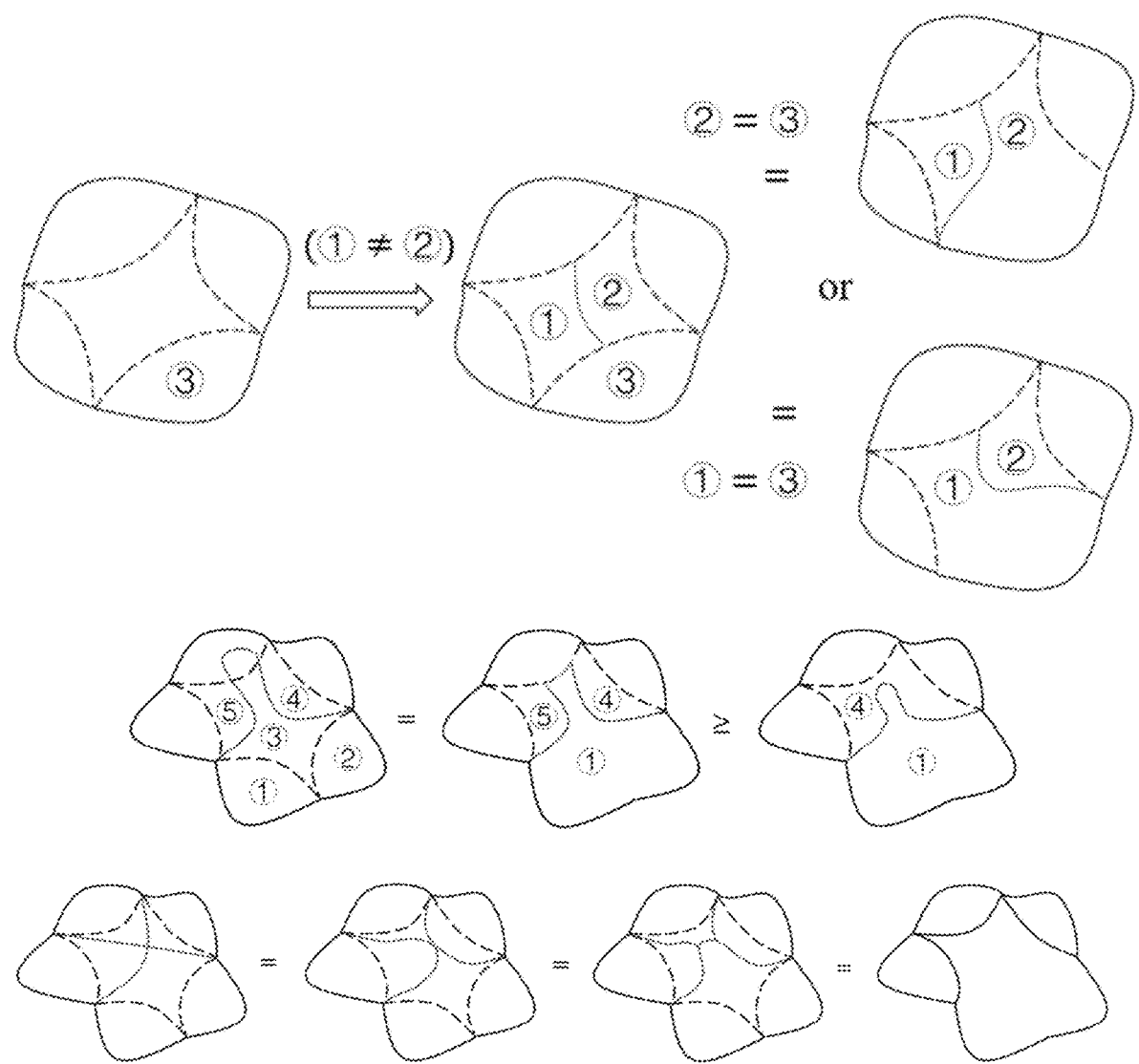
FIG. 2 shows three equivalent area decomposition methods for decomposition of a simply-connected cell.
Figure 3:
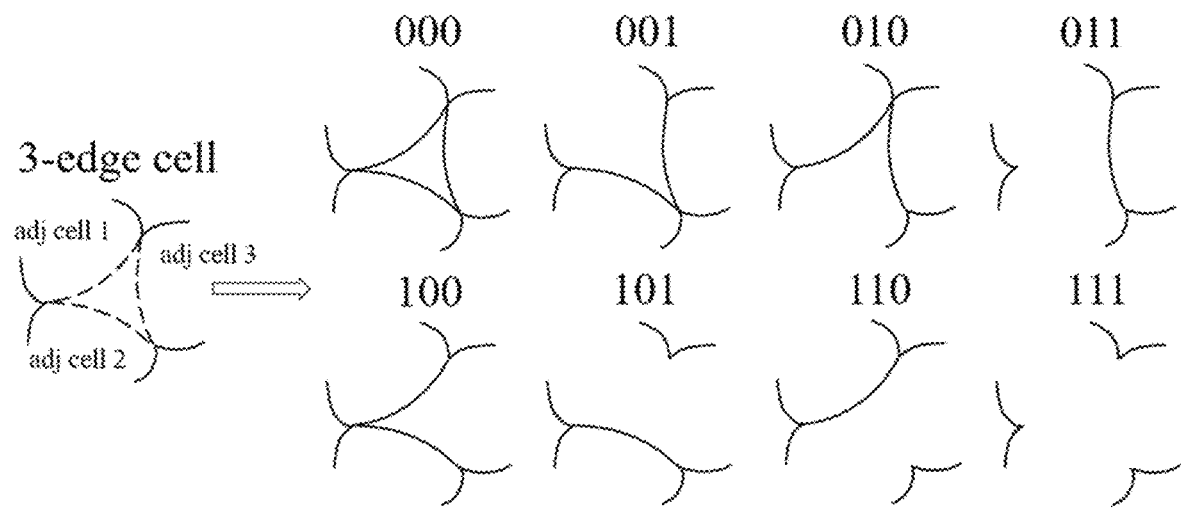
FIG. 3 shows all possible solutions for decomposing a simply-connected cell with three topological edges.
Figure 4:
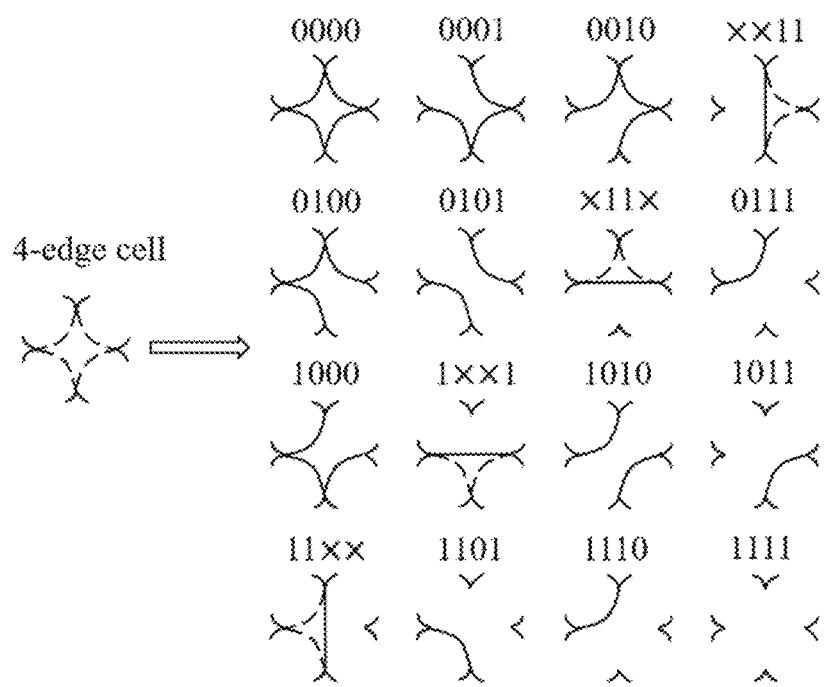
FIG. 4 shows all possible solutions for decomposing a simply-connected cell with four topological edges and sub-cells that are generated.

Step 4: For a simply-connected cell, three equivalences are given, and the decomposition methods of the cell have the same number of lift-offs. For any two equivalent decomposition methods of the cell, only one decomposition method needs to be considered, and it will not lose its optimality because the other decomposition method has the same, not a smaller number of lift-offs. Apparently, there are infinite methods to divide a simply-connected area on the surface of the object. Through the three equivalences given, most decomposition methods are excluded, and finally only a limited number of non-equivalent decomposition methods need to be considered. Refer to FIG. 2 where a dashed line represents a topological edge, a cutting path is designed to divide the cell into multiple parts, from which the following conclusions can be drawn. (1) It is meaningless to set any non-end point of the topological edge as a starting or ending point of the cutting path as the point can be continuously moved to an end point of the topological edge where it is located without increasing the number of lift-offs. (2) The cutting path does not need to stretch across other topological edges, otherwise it may cause unnecessary extra lift-offs. (3) There is no need to make the cutting paths intersect with each other, because this cutting method is equivalent to cutting the cell along the topological edge without increasing the number of lift-offs. All different cutting methods of a certain cell are encoded by using binary numbers, where the number of digits in the binary number represents the number of topological edges of the cell. The corresponding digits in the binary number are 1 or 0. 0 means that the topological edge is to be retained, that is, the two cells on both sides of the topological edge eventually have different numbers, and the end-effector is lifted off once when the manipulator performs the task. 1 means that the topological edge is to be discarded, that is, areas on both sides of the topological edge eventually have the same number, and are to be continuously covered by the end-effector without a lift-off when the manipulator performs the task. FIGS. 3 and 4 show all different area decompositions for a cell with three topological edges and a cell with four topological edges respectively. In FIG. 3, the leftmost is a simply-connected cell delineated by three dashed lines, which represent three topological edges. The adjacent cells stored in this cell are respectively upper left, lower left and right cells in a counterclockwise direction. The right part of FIG. 3 shows 8 different cutting methods represented by using binary numbers. 0 means that the corresponding topological edge is retained in the cellular decomposition, that is, it changes from a dashed line to a solid line. 1 means that the cells on both sides of the corresponding topological edge are connected together, and the topological edge in the middle is discarded, that is, the dashed line is discarded.

An optimal solution of a cell with 1, 2 or 3 topological edges is directly derived through enumeration. However, for a cell with more than 3 topological edges, a sub-cell may be formed after decomposition, and the topological edges of the sub-cell are still undetermined. Take xx11, x11x, 1xx1 and 11xx in FIG. 4 as an example, the 4-edge cell is decomposed to generate a 3-edge cell, where one edge of the sub-cell is a specified cutting path while the other two edges are topological edges to be determined to retain or discard. It should be noted that because the generated cutting path must be retained, for the entire solution process, generating a sub-cell will not cause more branches of solution for the problem. The sub-cell has less topological edges than the original cell, and all the sub-cells are solved recursively to obtain all possible solutions. For a certain cell, after its decomposition method is specified, as long as there is a contradiction in the enumeration process, the enumeration branch will be discarded.

Step 5: A two-connected cell has two boundaries, an inner boundary and an outer boundary, and each boundary is composed of a plurality of topological edges. In order to solve the two-connected cell, five analyses are made as follows:

(1) If the inner and outer boundaries of the two-connected cell are not connected by a cutting path, they can be solved separately.

Figure 5:
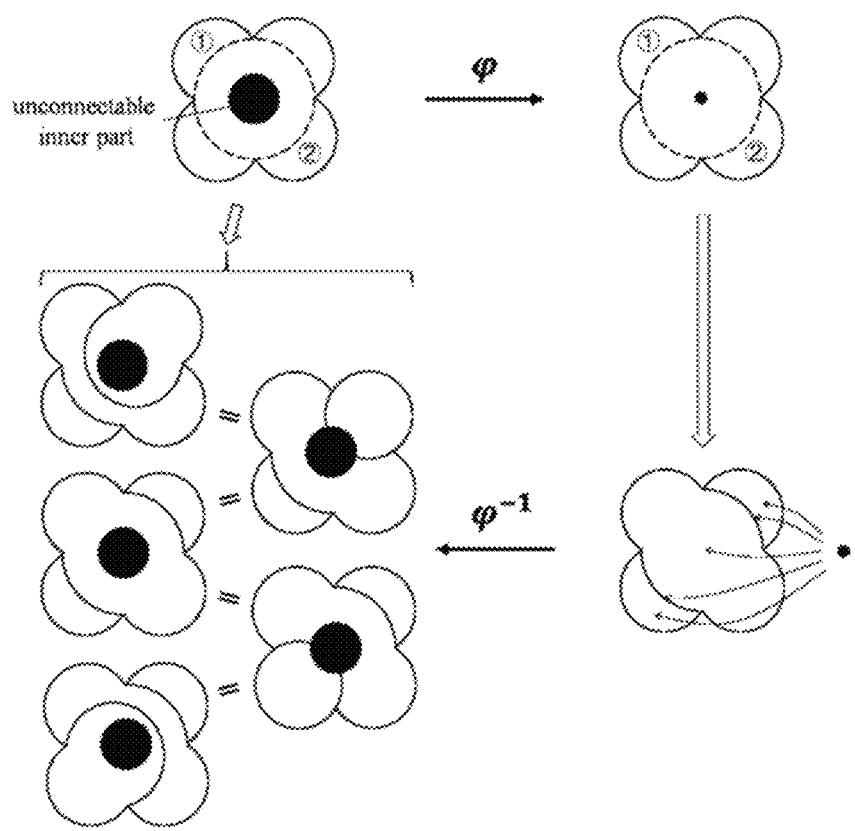
FIG. 5 shows an equivalence of two methods for solving a two-connected cell when there is no cutting path connecting an inner boundary and an outer boundary, wherein one method is to directly solve the two-connected cell, and the other method is to remove the inner boundary first, then solve a simply-connected cell delineated by the outer boundary, and finally place the inner boundary at any position of the outer boundary.

As shown in FIG. 5, it is expected to connect the adjacent first and second cells through the two-connected cell in the center (represented by concentric circles) such that they can be covered by the end-effector without a lift-off In the left part of FIG. 5, the two-connected cell is directly solved, and there are a total of five possible cases. In the right part of FIG. 5, the inner boundary is first removed, then the cell with only the outer boundary (a simply-connected cell) is solved by the method in Step 4, and finally the inner boundary is arbitrarily placed in the cell. It can be seen that the solutions on the left and right sides of FIG. 5 are equivalent. Therefore, for a two-connected cell, if the inner boundary is not cut off by a cutting path, the inner boundary can be removed first, then only the simply-connected cell formed by the outer boundary is solved, and finally the inner boundary is arbitrarily placed in the cell.

Figure 6:
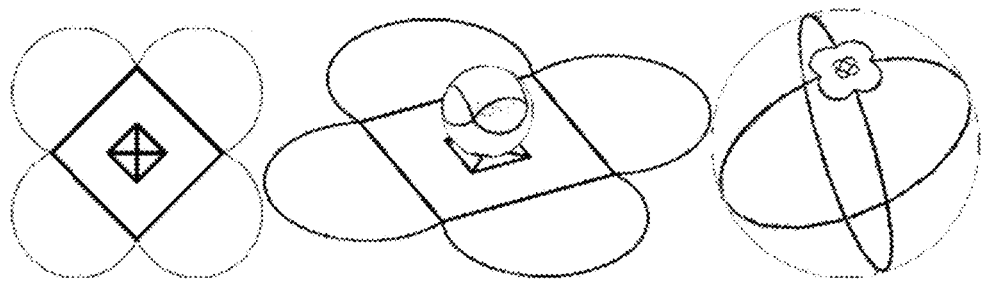
FIG. 6 shows an equivalence of an inner boundary and an outer boundary in a two-connected cell.

It will be explained in the following that the inner and outer boundaries have equivalent roles. As shown in FIG. 6, spherical projection is used to show the equivalence of the inner and outer boundaries. A projection sphere is place inside the inner boundary, and an image of the inner boundary on the sphere is like a circle near the south pole, while an image of the outer boundary on the sphere is like a circle closer to the north pole. When the radius of the projection sphere shrinks to close to zero, it can be seen that the images of the inner and outer boundaries have become new outer and inner boundaries respectively. Therefore, the roles of the inner and outer boundaries can be interchanged.

In summary, when the cutting path of a two-connected cell does not connect its inner and outer boundaries, the two-connected cell can be solved by being divided into two simply-connected cells.

Figure 7:
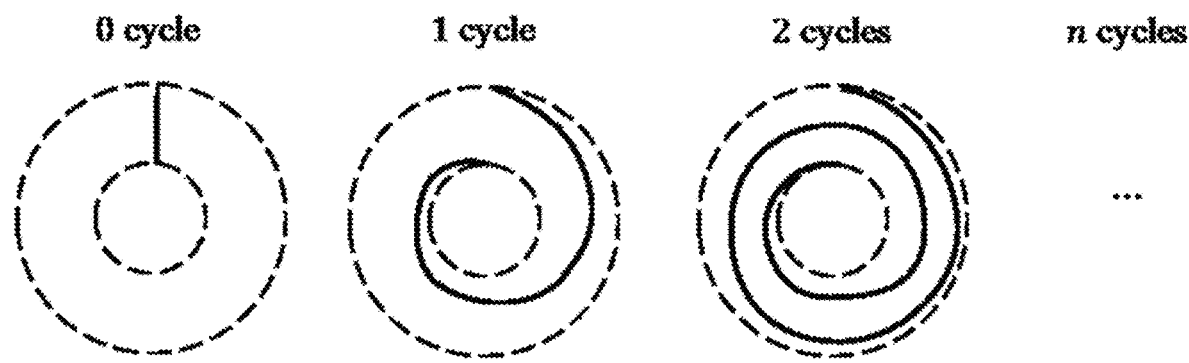
FIG. 7 shows cyclic and acyclic cutting paths in a two-connected cell.
Figure 8:
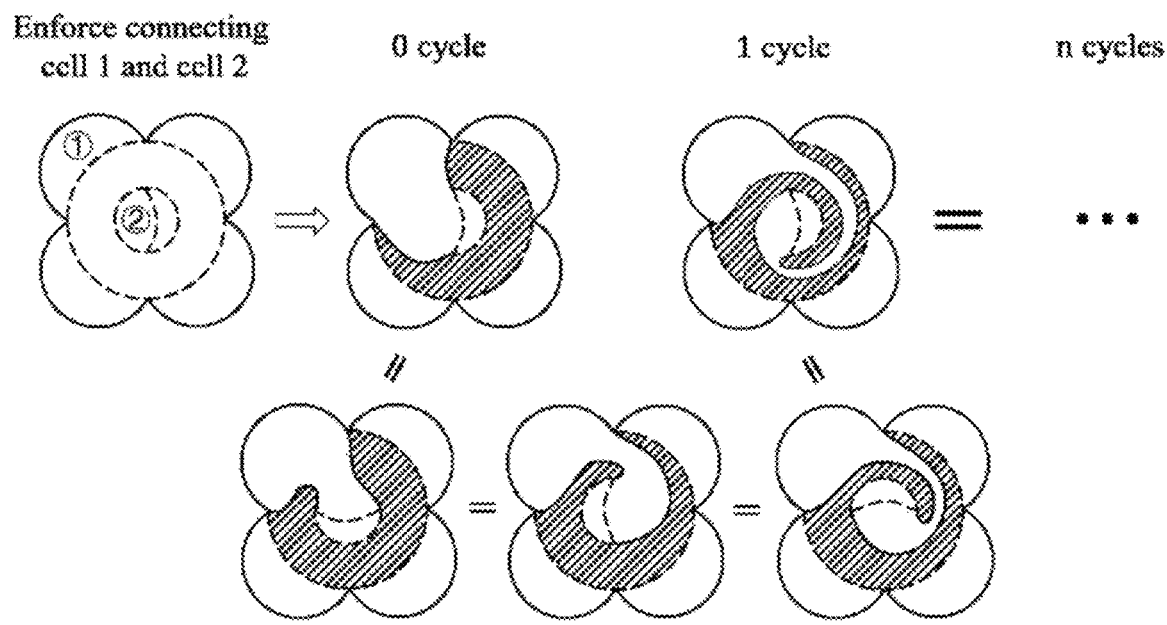
FIG. 8 shows an equivalence of cyclic and acyclic cutting paths in a two-connected cell.

(2) The cyclic cutting paths shown in FIG. 7 do not need to be considered, because they are equivalent to the solutions of acyclic cutting paths. As shown in FIG. 8, by continuously rotating the inner boundary of the two-connected cell, it is easy to see the equivalence of the cyclic cutting path and the acyclic cutting path.

Figure 9:
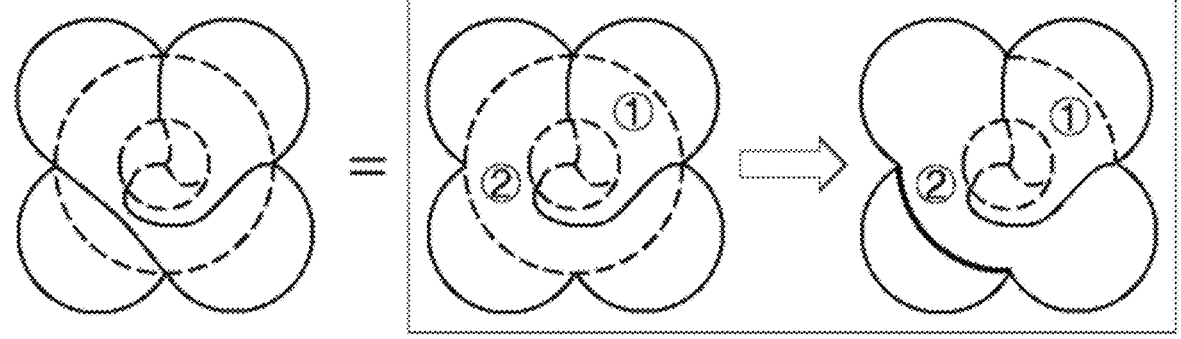
FIG. 9 shows cutting paths in a two-connected cell that do not connect inner and outer boundaries, which can be regarded as cutting paths for further decomposing two separated simply-connected sub-cells.

(3) All cutting paths of the two-connected cell can be divided into two types, that is, cutting paths that transform the two-connected cell into a simply-connected cell and cutting paths that transform the two-connected cell into a simply-connected cell and then are specified in the newly generated simply-connected cell. As shown in FIG. 9, the decomposition of the two-connected cell (in the left of FIG. 9) includes two steps. First, the two-connected cell is transformed into a simply-connected cell through the cutting paths connecting the inner and outer boundaries on the upper and right (FIG. 9). Then, a cutting path is added to the simply-connected cell (in the right of FIG. 9).

Figure 10:
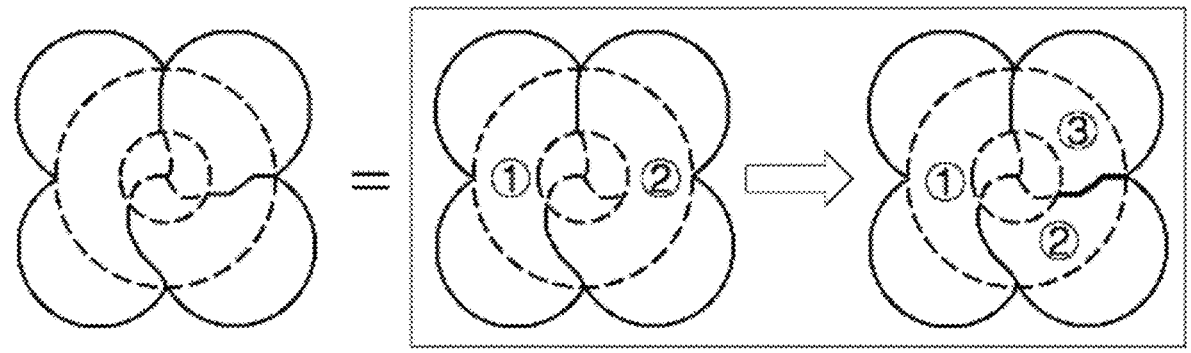
FIG. 10 shows more than two cutting paths in a two-connected cell that connect inner and outer boundaries, which can be regarded as cutting paths for further decomposing two separated simply-connected sub-cells.

(4) Among the two cutting paths mentioned in (3), there must be two first cutting paths. The reasons are as follows. First of all, a single cutting path cannot transform a two-connected cell into a simply-connected cell, but only leads to a contradiction. The existence of a cutting path means that the cells on both sides of the cutting path will eventually be assigned different numbers. However, both sides of the cutting path connecting the inner and outer boundaries of the two-connected cell belong to the same cell, and it is impossible to assign different numbers to the cell. Secondly, if there are more than two cutting paths connecting the inner and outer boundaries (in the left of FIG. 10), it can be considered that two cutting paths are first used to divide the two-connected cell into two simply-connected cells (in the middle of FIG. 10), and then a third cutting path is specified in a simply-connected cell (in the right of FIG. 10). Therefore, when a two-connected cell is solved, the two-connected cell must be divided into two simply-connected cells first, and then the simply-connected cells are further decomposed.

(5) Designing two cutting paths connecting the inner and outer boundaries in the two-connected cell is equivalent to selecting a series of continuous topological edges on the inner and outer boundaries, and designating them as the boundary of one simply-connected cell generated. The unselected topological edges on the inner and outer boundaries of the two-connected cell serve as the topological edges of the other generated simply-connected cell. Assuming that the inner and outer boundaries $\omega$, $\omega'$ of the two-connected cell are arranged in order by J, K topological edges respectively, the topological edges are numbered as:

$$\omega=(a_1, \ldots, a_J),$$

$$\omega'=(a'_1, \ldots, a'_K),$$

where, the brackets indicate that the elements are sorted in order. Some continuous elements are selected from these two brackets, and in order to avoid cyclic selection, the sub-cell where $a_1$ is located is taken as the first simply-connected cell. Apparently, the selections in ω are as follows (where the i-th row lists all possible selections of i elements):

$$\{a_1\};$$

$$\{a_1, a_2\}, \{a_J, a_1\};$$

$$\ldots;$$

$$\{a_1, \ldots, a_{J-1}\}, \ldots, \{a_3, \ldots, a_J, a_1\}.$$

Similarly, the selections in ω' are as follows (where the i-th row lists all possible selections of i elements):

$$\{a'_1\}, \{a'_2\}, \ldots, \{a'_K\};$$

$$\{a'_1, a'_2\}, \ldots, \{a'_K, a'_1\};$$

$$\ldots;$$

$$\{a'_1, \ldots, a'_{K-1}\}, \{a'_K, a'_1, \ldots, a'_{K-2}\}, \ldots, \{a'_2, \ldots, a'_K\}.$$

Therefore, the two-connected cell is decomposed as follows:

(5.1) For cutting paths that do not connect the inner and outer boundaries, the inner and outer boundaries are separated to obtain two simply-connected cells, and the two cells are solved separately.

(5.2) For cutting paths that connect the inner and outer boundaries, two cutting paths that connect the inner and outer boundaries are first designed, that is, a decomposition problem of the two-connected cell is transformed into a decomposition problem of two simply-connected cells, and then the simply-connected cells are solved by the method in Step 4.

Step 6. For an n-connected cell, there are n-1 inner boundaries inside the n-connected cell. It can be seen from the analysis (1) in Step 5 that if any one of the n-1 inner boundaries is not connected by the cutting path, then this inner boundary can be ignored first. After the remaining part is decomposed, this boundary is placed at any position. Because the remaining part has only n-2 inner boundaries, it is an (n-1)-connected cell. By induction, the solution of the (n-1)-connected cell is given. Therefore, when there is an inner boundary not connected by any cutting path, an n-connected cell can be solved as above. The following description assumes that all inner boundaries are connected by a cutting path.

An n-connected cell can be solved by turning it into an (n-1)-connected cell only by connecting any inner boundary with the outer boundary. Therefore, by using the strategy of placing the inner boundaries into the outer boundary one by one, the n-connected cell is decomposed as follows:

(6.1) The n-1 inner boundaries of the n-connected cell are numbered, where topological edges on the outer boundary and an i-th inner boundary are expressed as follows:

$$\omega=(a_1, \ldots, a_K),$$

$$\omega^i=(a_1^i, \ldots, a_{J_i}^i), i=1, \ldots, n,$$

where, $a_K$ represents a topological edge between the cell and a K-th external adjacent cell, and $a_{J_i}^i$ represents a topological edge between the cell and a cell numbered J on the i-th inner boundary.

(6.2) Only the outer boundary ω and a first inner boundary $\omega^1$ are considered, and two cutting paths are designed in a two-connected cell delineated by ω and $\omega^1$ to obtain two simply-connected cells according to the solution process of the two-connected cell in Step 5.

(6.3) A second inner boundary $\omega^2$ is placed into one of the two simply-connected sub-cells generated in Step (6.2).

(6.4) The simply-connected sub-cell where $\omega^2$ is placed in Step (6.3) is turned into a two-connected sub-cell. The two-connected sub-cell is processed by Step 5, and it is divided into two simply-connected sub-cells. So far, the cell including ω, $\omega^1$, $\omega^2$ is divided into three simply-connected sub-cells.

(6.5) Each of subsequent inner boundaries $\omega^3, \ldots, \omega^{n-1}$ is subjected to the processing in Steps (6.3) and (6.4): place $\omega^3, \ldots, \omega^{n-1}$ into one of the generated simply-connected sub-cells to obtain a two-connected cell, and then divide the cell into two simply-connected sub-cells. When the i-th inner boundary is placed, the original cell is divided into i parts.

(6.6) The n-1 inner boundaries are all placed into the cell to divide the original cell into n simply-connected sub-cells, and the n simply-connected sub-cells are solved by Step 4.

Figure 11:
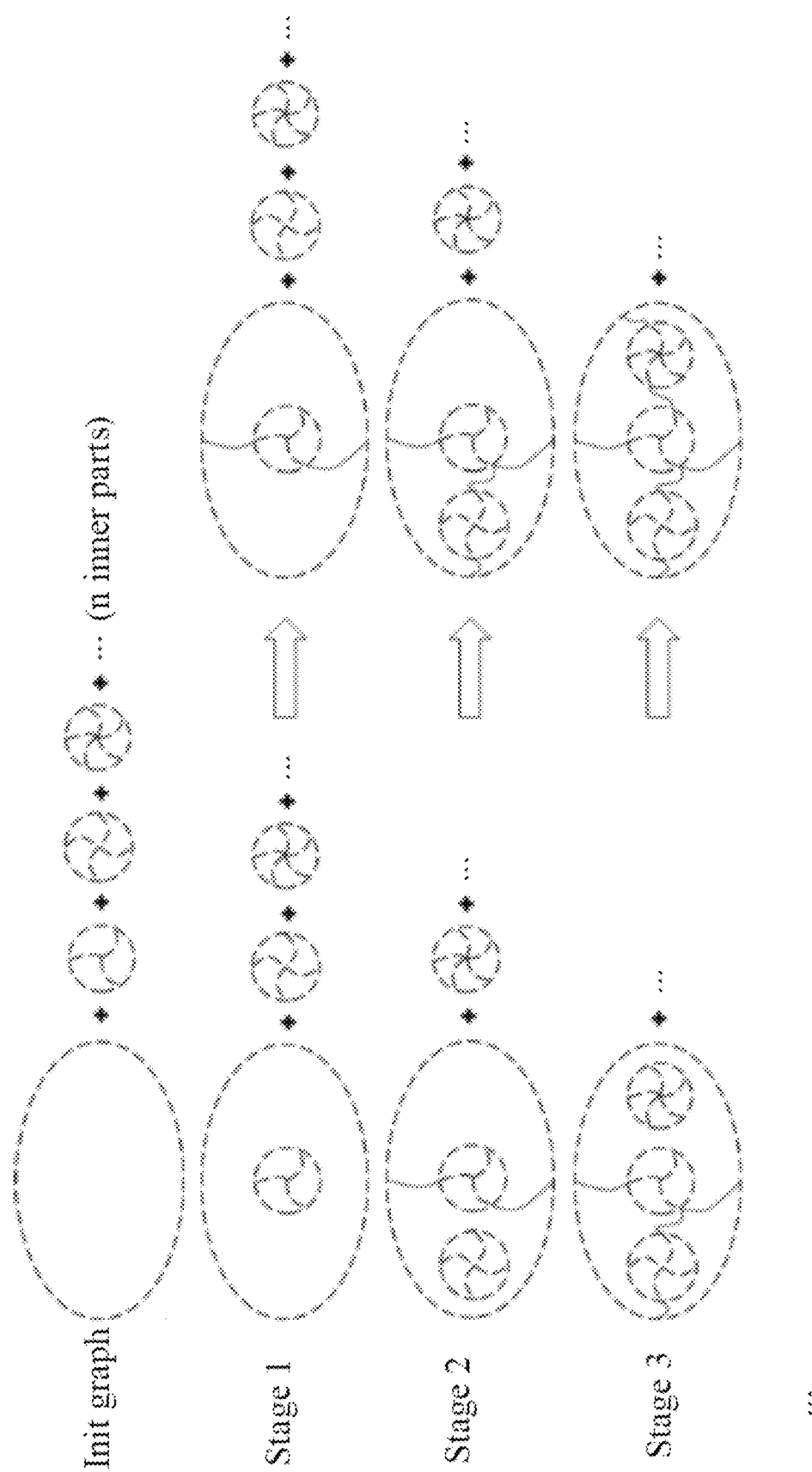
FIG. 11 is a flowchart of iteratively solving an n-connected cell.
Figure 12:
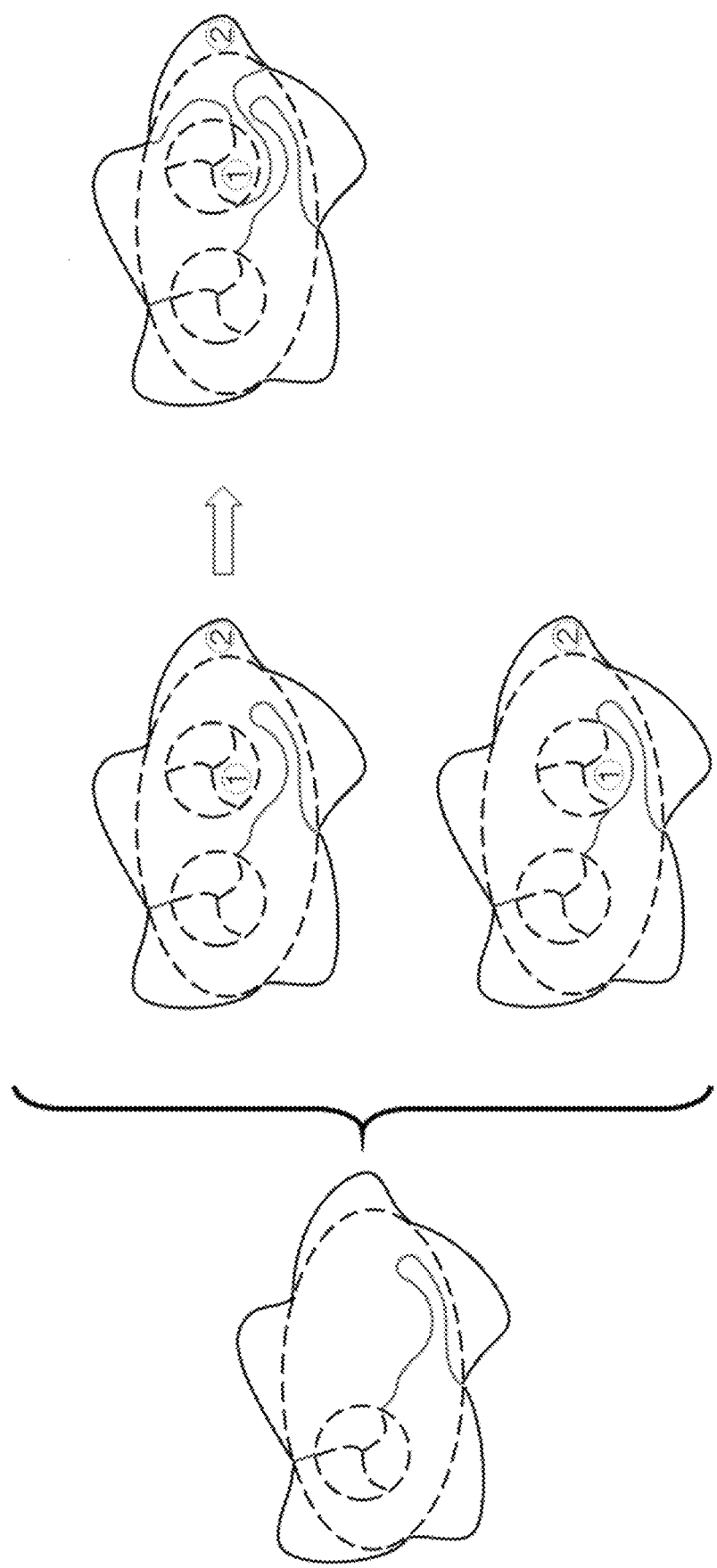
FIG. 12 shows the optimality of placing a second inner boundary in a three-connected cell without placing the second inner boundary on an existing cutting path in a case where an inner boundary has already been placed and a division is completed.
Figure 13:
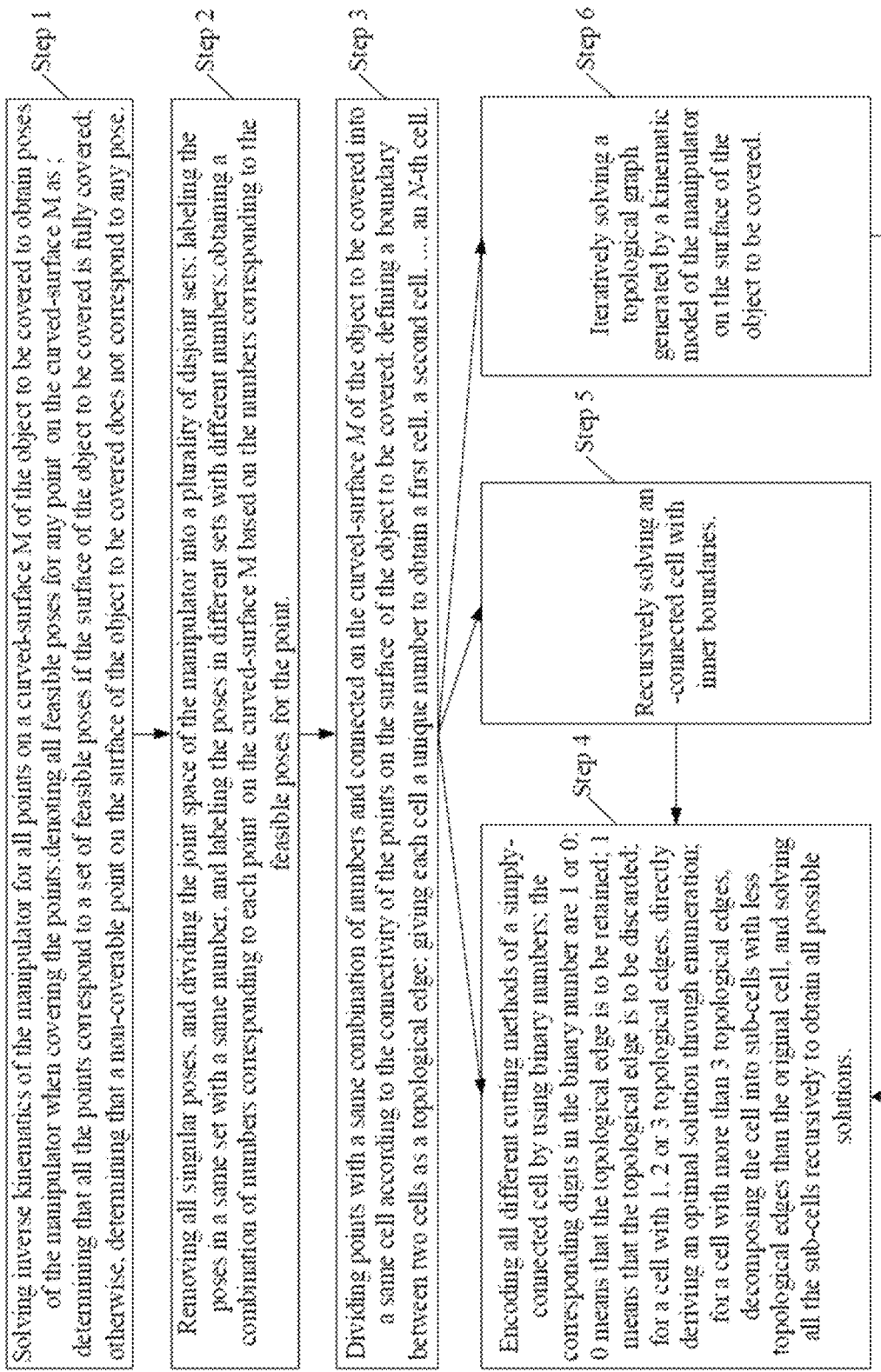

The decomposition of the n-connected cell is shown in FIG. 11. By traversing all the different cases in analyses (1) to (5), all possible solutions of a simply-connected cell can be obtained by introducing the following equivalence. When a new inner boundary is inserted into an existing boundary and a specified cutting path, there is no need to consider the case when the existing cutting path stretches across the new inner boundary, and it is only necessary to place the new inner boundary into the already generated sub-cell. This equivalence is shown in FIG. 12.

Step 7: A topological graph generated by a kinematic model of the manipulator on the surface of the object to be covered is iteratively solved according to the solution process in Steps 4 to 6.

(7.1) For the first cell on the surface of the object to be covered, all possible cutting methods for the first cell are traversed and numbered to complete all solutions of the first cell, and each of all the solutions is processed by Step (7.2).

(7.2) For the second cell on the surface of the object to be covered, all possible cutting methods for the second cell are traversed and numbered to complete all solutions of the second cell; a solution of the second cell that contradicts with a setting of the first cell is discarded, and each of the remaining feasible solutions of the second cell is processed by Step (7.3).

(7.3) The third to the N-th cells on the surface of the object to be covered are sequentially processed by Step (7.2), such that each cell is provided with a cutting method, and each sub-cell divided has a unique number, thereby obtaining an approach for the manipulator to cover the sub-cell.

The designation strategy of the numbers ($\{c_1, \ldots, c_n\}$) in this method is constructed based on the continuity in the joint space of the manipulator. When manipulators of different configurations and dimensions are used to process different surfaces, the definition of the continuity may vary. Any other method that divides the feasible poses of the manipulator in the coverage task according to the continuity of the joint space of the manipulator and aims to achieve the least number of lift-offs is equivalent to specifying a certain number. Therefore, such variation should be deemed as falling within the protection scope of the present disclosure.

This method employs enumeration and traversal to obtain all optimal solutions for the non-redundant manipulator to perform the coverage task with the least number of lift-offs from the surface of the object. However, when only some of all possible combinations are checked, some optimal solutions or some approximately optimal solutions can also be obtained. Therefore, other methods that do not use the enumeration strategy but aim to obtain an optimal solution or an approximate optimal solution for the manipulator to perform the coverage task should also be deemed as falling within the protection scope of the present disclosure.

Non-redundant manipulators are typically applied in the following scenarios: (1) a five-degree-of-freedom manipulator is used to cover a surface area of a three-dimensional (3D) object by making the end-effector perpendicular to the surface of the object, such as surface finishing of metal parts and automobiles; (2) a two-degree-of-freedom manipulator is used to cover a flat area, such as desktop wiping; (3) a four-degree-of-freedom manipulator is used to paint the surface area of a 3D object; (4) a six-degree-of-freedom manipulator is used to complete a close-up observation of the surface area of a 3D object.

Embodiment

A non-redundant manipulator needs to cover a "+"-shaped area. By Step 1 of the method of the present disclosure, inverse kinematics of the manipulator to cover each point on a surface of an object is solved to obtain a set of continuous poses that can cover "-" and a set of continuous poses that can cover "|". By Step 2 of the method of the present disclosure, all poses are numbered. All poses that can cover "-" are numbered 1, and all poses that can cover "|" are numbered 2. By Step 3 of the method of the present disclosure, cells are constructed. A constructed topological graph is the same as that shown in FIG. 1, so the same cell numbers as in FIG. 1 can be used. The coverable poses of the manipulator in a first cell are {1}, where the curly brackets indicate that the order of the elements therein has no specific meaning. The coverable poses of the manipulator in adjacent cells are (2), where the parentheses indicate that the elements therein are arranged in order. The coverable poses of the manipulators in second, third, fourth and fifth cells are sequentially {1, 2}, {2}, {2}, {1}, and the coverable poses of the manipulators in adjacent cells are sequentially (1, 4, 5, 3), (2), (2), (2). According to the solution process described in Step 4, the first, third, fourth and fifth cells each only have a unique method for numbering and cutting, so only the second cell needs to be solved. The solving indicates that when the cutting method of (1) of the second cell is 1010 and the number is set to 1, or the cutting method of (2) is 0101 and the number is set to 2, the problem can be optimally solved. The physical meanings of these two solutions are as follows. (1) The manipulator first uses the pose numbered 1 to cover the areas where the first, second and fifth cells are located, and the end-effector is then lifted off once; the manipulator uses the pose numbered 2 to cover the area where the third cell is located, and then the end-effector is lifted off once; the manipulator finally uses the pose numbered 2 to cover the area where the fourth cell is located. (2) The manipulator first uses the pose numbered 2 to cover the areas where the second, third and fourth cells are located, and the end-effector is then lifted off once; the manipulator uses the pose numbered 1 to cover the area where the first cell is located, and then the end-effector is lifted off once; the manipulator finally uses the pose numbered 1 to cover the area where the fifth cell is located. The number of lift-offs involved in each of the two solutions is minimized to 2.

It should also be noted that the present disclosure is not limited to the above embodiment, and various modifications may be made to these embodiment. All modifications that can be directly derived or conceived by a person of ordinary skill in the art from the specification of the present disclosure should be deemed as falling within the protection scope of the present disclosure.

What is claimed is:

1. A method for performing a non-revisiting coverage task by a manipulator with a least number of lift-offs, wherein an end-effector of the manipulator is in point contact with a surface of an object to be covered; a relative positional relationship among the object to be covered, the manipulator and a surrounding obstacle is known and remains unchanged during the performing of the coverage task;

the method for performing the non-revisiting coverage task by the manipulator with the least number of lift-offs specifically comprises following steps:

Step 1: solving inverse kinematics of the manipulator for all points on a curved-surface M of the object to be covered to obtain poses of the manipulator when covering the points; denoting all feasible poses for any point p on the curved-surface M as $\{J_{p1}, J_{p2}, \ldots, J_{pn}\}$; determining that all the points correspond to a set of feasible poses if the surface of the object to be covered is fully covered; otherwise, determining that a non-coverable point on the surface of the object to be covered does not correspond to any pose, wherein the feasible poses for all the points on the surface M constitute a joint space of the manipulator, and the joint space of the manipulator comprises singular and non-singular poses;

Step 2: removing all singular poses, and dividing the joint space of the manipulator into a plurality of disjoint sets, wherein each set stores poses that can be continuously executed by the manipulator; labeling the poses in a same set with a same number, and labeling the poses in different sets with different numbers; numbering the different sets as $c_1, \ldots, c_n$; obtaining a combination of numbers corresponding to each point p on the curved-surface M based on the numbers corresponding to the feasible poses for the point;

Step 3: dividing points with a same combination of numbers and connected on the curved-surface M of a object to be covered into a same cell according to the connectivity of the points on the surface M of the object to be covered; defining a boundary between two cells as a topological edge; giving each cell a unique number to obtain a first cell, a second cell, . . . , an N-th cell, wherein each cell covers different types of poses of the manipulator within this cell (represented by the combination of numbers), and stores numbers of adjacent cells in sequence;

Step 4: encoding all different cutting methods of a simply-connected cell by using binary numbers, wherein a number of digits in the binary number represents a number of topological edges of the cell; the corresponding digits in the binary number are 1 or 0; 0 means that the topological edge is to be retained, that is, the two cells on both sides of the topological edge eventually have different numbers, and the end-effector is lifted off once when the manipulator performs the task; 1 means that the topological edge is to be discarded, that is, areas on both sides of the topological edge eventually have the same number, and are to be continuously covered by the end-effector without a lift-off when the manipulator performs the task; for a cell with 1, 2 or 3 topological edges, directly deriving an optimal solution through enumeration; for a cell with more than 3 topological edges, decomposing the cell into sub-cells with less topological edges than the original cell, and solving all the sub-cells recursively to obtain all possible solutions;

Step 5: recursively solving an n-connected cell with n-1 inner boundaries, wherein, the n-connected cell is decomposed as follows:

(5.1) when n=1, the cell is a simply-connected cell as described in Step 4, and the cell is solved by Step 4;

(5.2) when n=2, the cell has two boundaries, an inner boundary and an outer boundary; each boundary is composed of a plurality of topological edges, and each topological edge is connected to the other cell; all possible solutions of the two-connected cell are completely classified as follows:

(5.2.1) for cutting paths that do not connect the inner and outer boundaries, separating the inner and outer boundaries to obtain two simply-connected cells, and solving the two cells separately;

(5.2.2) for cutting paths that connect the inner and outer boundaries, first designing two cutting paths that connect the inner and outer boundaries, that is, transforming a decomposition problem of the two-connected cell into a decomposition problem of two simply-connected cells, and then solving the simply-connected cells by the method in Step 4;

(5.3) when n>2, numbering the n-1 inner boundaries of the n-connected cell, wherein topological edges on an outer boundary and an i-th inner boundary are expressed as follows:

$$\omega = (a_1, \ldots, a_K),$$

$$\omega^i = (a_1^i, \ldots, a_{J_i}^i), i=1, \ldots, n,$$

wherein, $a_K$ represents a topological edge between the cell and a K-th external adjacent cell, and $a_{J_i}^i$ represents a topological edge between the cell and a cell numbered $J_i$ on the i-th inner boundary;

(5.3.1) considering only the outer boundary $\omega$ and a first inner boundary $\omega^1$, and designing two cutting paths in a two-connected cell delineated by $\omega$ and $\omega^1$ to obtain two simply-connected cells according to the solution process of the two-connected cell in Step 5;

(5.3.2) placing a second inner boundary $\omega^2$ into one of the two simply-connected sub-cells generated in Step (5.3.1), such that the simply-connected sub-cell with $\omega^2$ is turned into a two-connected sub-cell; solving the two-connected sub-cell by Step (5.2), and finally dividing the sub-cell into two simply-connected sub-cells, wherein after this step, the original n-connected cell comprises $\omega$, $\omega^1$, $\omega^2$ and is divided into three simply-connected sub-cells;

(5.3.3) subjecting each of subsequent inner boundaries $\omega^3, \ldots, \omega^{n-1}$ the following processing in sequence: placing $\omega^3, \ldots, \omega^{n-1}$ into one of the generated simply-connected sub-cells to obtain a two-connected cell, and then further dividing the cell into two simply-connected sub-cells; placing the i-th inner boundary to divide the original cell into i parts; placing n-1 inner boundaries into the cell to divide the original cell into n simply-connected sub-cells; solving the n simply-connected sub-cells by Step 4; and Step 6: iteratively solving a topological graph generated by a kinematic model of the manipulator on the surface of the object to be covered according to the solution process in Step 4 and Step 5:

(6.1) for the first cell on the surface of the object to be covered, traversing and numbering all possible cutting methods for the first cell to complete all solutions of the first cell, and processing each of all the solutions by Step (6.2);

(6.2) for the second cell on the surface of the object to be covered, traversing and numbering all possible cutting methods for the second cell to complete all solutions of the second cell; discarding a solution of the second cell that contradicts with a setting of the first cell, and processing each of the remaining feasible solutions of the second cell by Step (6.3);

(6.3) sequentially processing the third to the N-th cells on the surface of the object to be covered by Step (6.2), such that each cell is provided with a cutting method, and each sub-cell divided has a unique number, thereby obtaining an approach for the manipulator to cover the sub-cell.

2. The method for performing the non-revisiting coverage task by the manipulator with the least number of the lift-offs according to claim 1, wherein the points on the surface of the object to be covered are only covered once.

* * * * *